May 7, 1968  N. A. CARTER, JR., ETAL  3,381,974
CONTAINER CHASSIS AND CASTER AXLE ASSEMBLY
Filed June 2, 1966  3 Sheets-Sheet 3

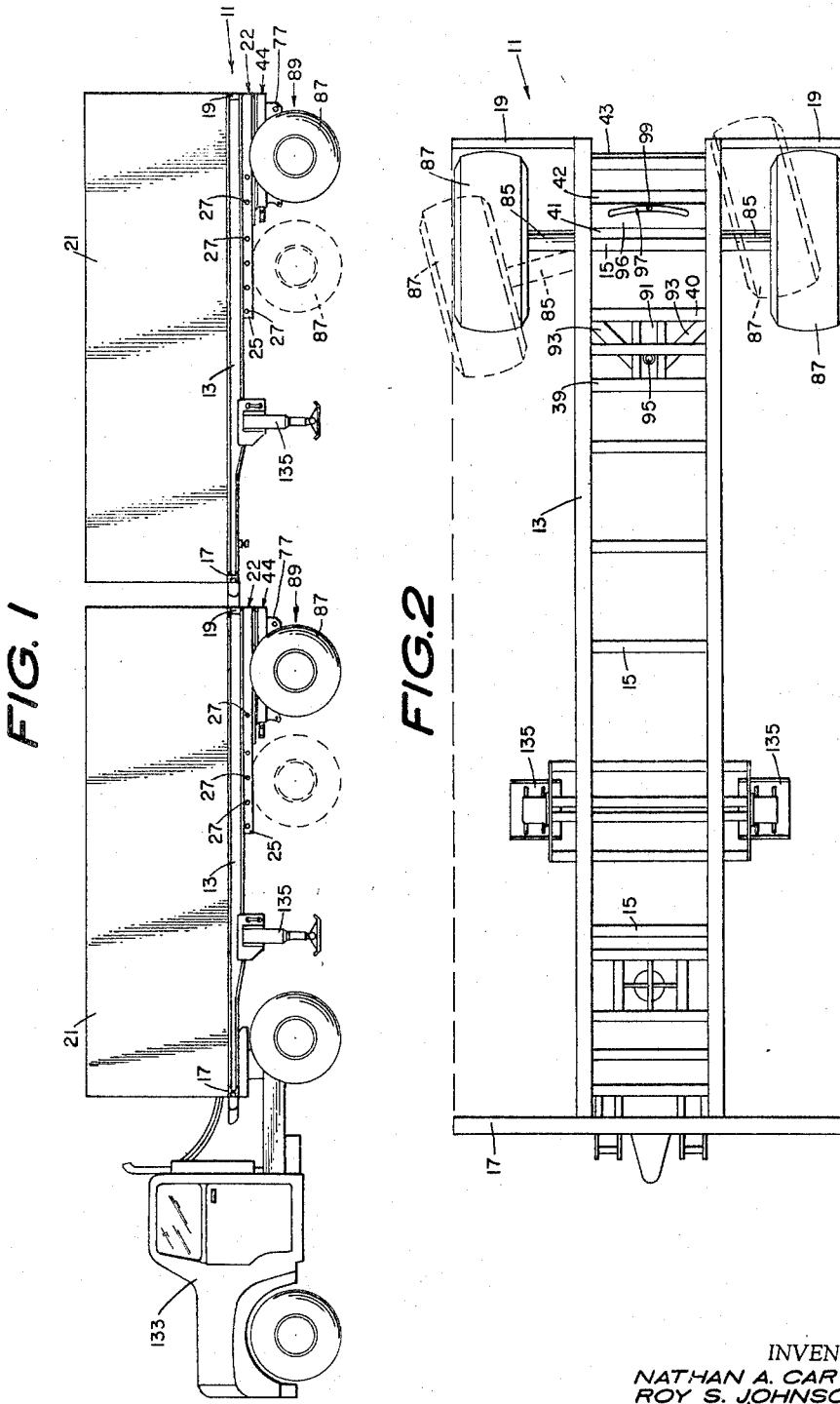

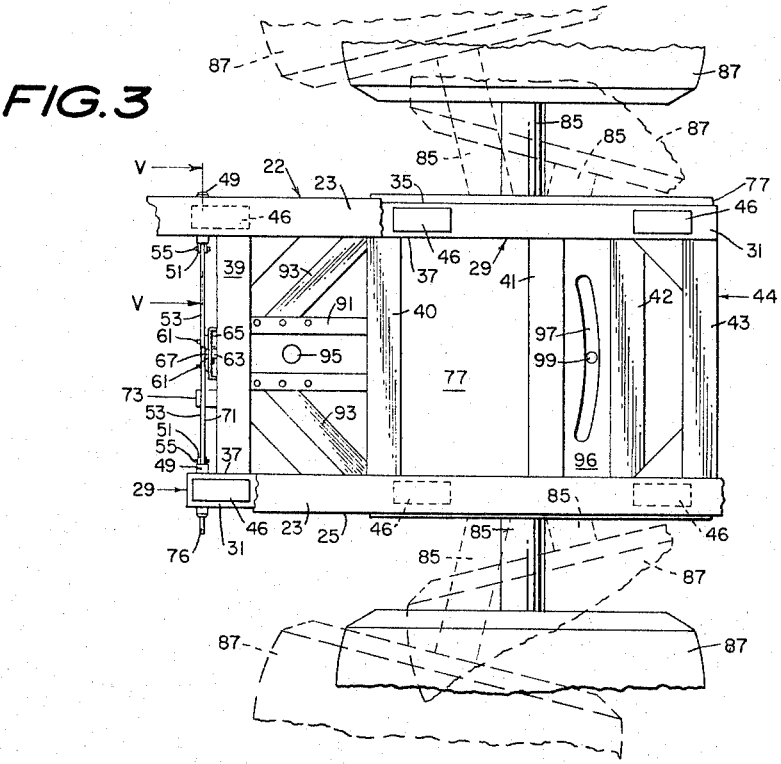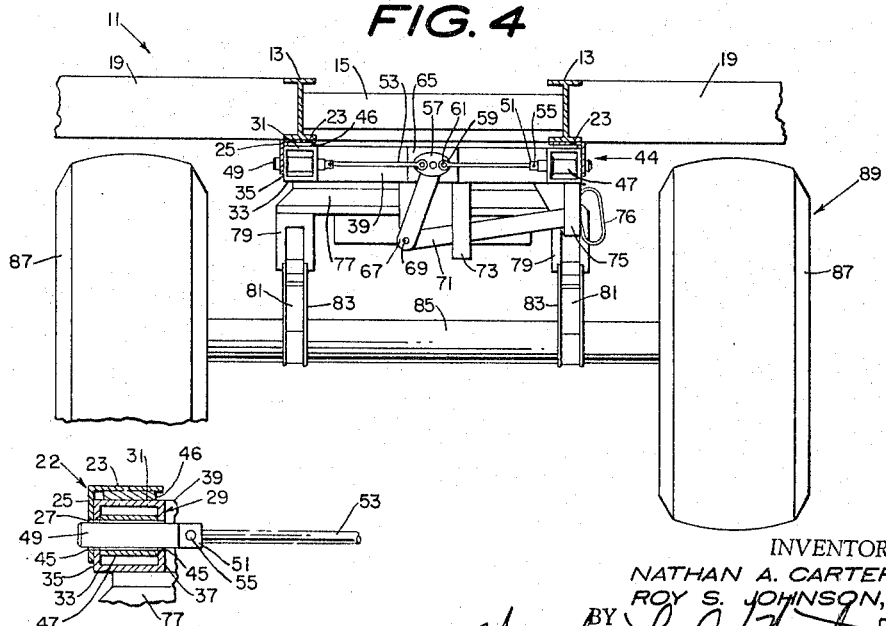

INVENTORS,
NATHAN A. CARTER, JR.
ROY S. JOHNSON, JR.
BY

United States Patent Office 3,381,974
Patented May 7, 1968

3,381,974
CONTAINER CHASSIS AND CASTER
AXLE ASSEMBLY
Nathan Alexander Carter, Jr., and Roy Sidney Johnson, Jr., Memphis, Tenn., assignors to Arrow Trailers, Inc., Memphis, Tenn., a corporation of Tennessee
Filed June 2, 1966, Ser. No. 554,799
4 Claims. (Cl. 280—81)

ABSTRACT OF THE DISCLOSURE

A trailer chassis for supporting demountable containers and being detachably mounted upon a slidably adjustable axle for stability and load distribution adjustment. The axle has a pivotal wheel assembly selectively capable of castering while the chassis is in motion but may be secured out of castering condition when the chassis is attached rearwardly of a towing tractor and forwardly of a similar trailer chassis and container.

This invention relates to new and useful improvements in container chassis, and more particularly to chassis supporting demountable containers.

The present invention further relates to a chassis provided with a slidable axle having a pivotal wheel assembly capable of castering while the chassis is in motion.

There have heretofore been numerous devices comprising chassis and containers in combination mounted upon wheel bearing axles, but none of these prior devices have provided a chassis detachably mounted upon a slidably adjustable axle to maintain stability and facilitate load distribution. These prior devices have additionally failed to provide castering means for the axle when the chassis is used in tandem with another similar chassis and container.

The present invention additionally comprises means for selective longitudinal shifting of the axle and wheel assembly in combination with a movable adjustable landing gear to effect a more efficient stabilization of the payload carried by the container mounted on the chassis.

The present invention further provides apertured channels for the selective spacing of the axle with relation to the chassis, and manually releasable lock means for engagement with and displacement from the castering means when the chassis is attached rearwardly of the towing tractor and forwardly of a similar trailing chassis and container.

The principal object of the present invention is to provide a container carrying chassis comprising an axle and wheel assembly attached thereto and means for castering the axle and wheel assembly with relation to the longitudinal axis of the chassis.

Another object of the present invention is to provide locking means for a castering device mounted upon an axle of a container carrying chassis.

A further object of the present invention is to provide a container carrying chassis having a longitudinally shiftable axle and wheel assembly.

Another object of the present invention is to provide a chassis with a plurality of spaced apart rails to carry a shiftable axle and wheel assembly.

A further object of the present invention is to provide a trailer type chassis having axle carrying beams with spaced apertures defined in the rails for selective positioning of the axle along the chassis.

Another object of the present invention is to provide a chassis having a slidable axle and wheel assembly, with longitudinally shiftable retractable landing gear for use in combination with the slidable axle for load stabilization and efficient weight distribution.

A further object of the present invention is to provide a chassis having a slidable axle carried by a plurality of apertured beams with lock means to retain the axle in desired position; and Another object of the present invention is to generally improve the design, construction and efficiency of container chassis.

The means by which the foregoing and other objects of the present invention are accomplished and the manner of their accomplishment will be readily understood from the following specification upon reference to the accompanying drawings, in which:

FIG. 1 is a side elevational view of the device of the present invention mounted beneath a pair of containers.

FIG. 2 is a plan view of the device of FIG. 1 with the containers removed.

FIG. 3 is an enlarged fragmentary plan view of the device of FIG. 2 with the axle shown in castered condition.

FIG. 4 is a rear elevational view of the device of FIG. 3.

FIG. 5 is a fragmentary vertical cross sectional view of the device of FIG. 3 as taken on the line V—V of FIG. 3.

Figure 6:
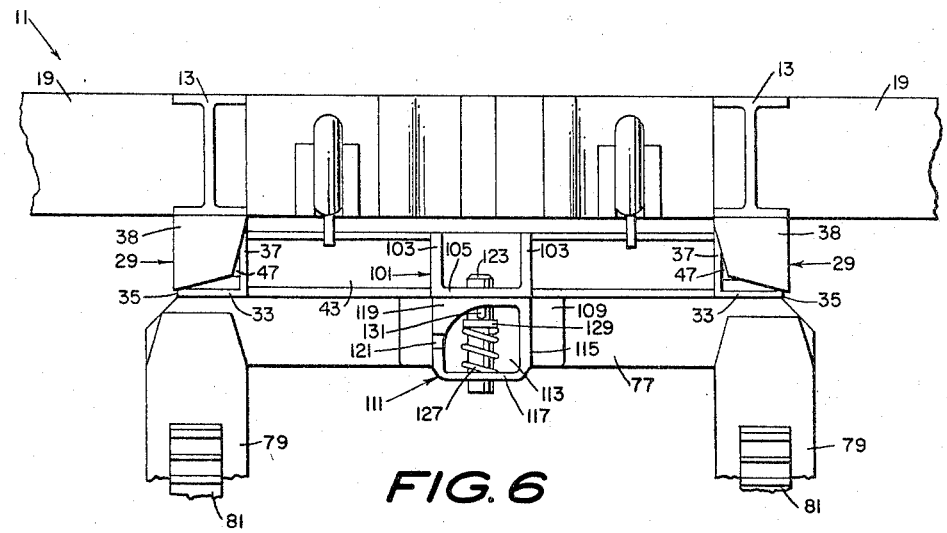
FIG. 6 is a further enlarged fragmentary rear elevational view of the device of FIG. 4 illustrating the device in locked position.

Referring now to the drawings in which the various parst are indicated by numerals, the embodiment of the present invention comprises a chassis 11 provided with a pair of longitudinally disposed, spaced apart, substantially parallel structural members 13 substantially coextensive in length with the chassis 11, and a plurality of spaced apart, laterally disposed struts 15 interposed perpendicularly between the structural members 13 to maintainn the longitudinal beams 13 in rigid substantially parallel alinement. The chassis 11 is additionally provided with a stabilizer bar 17 attached to the forward ends of the structural members 13, extending outwardly right angularly from the structural members 13, and a pair of outrigger struts 19 attached to the rearmost ends of the longitudinal beams 13 extending axially outwardly from the structural members 13 a distance substantially equal to the length of the bar 17 and in planar alinement therewith to form a platform for the mounting thereupon of a suitable container 21.

The present invention further comprises a pair of inverted angular trackways 22 coextensive in length with relation to each other provided with a horizontally disposed imperforate leg 23 and a substantially perpendicular depending leg 25 coextensive in length with the imperforate leg 23. The imperforate legs 23 are attached to the base portions of the structural members 13 in underlying adjacency and extend in length from the rearmost end of the structural members 13 forwardly to a point of termination somewhat greater than half the length of the structural members 13. Each of the depending legs 25 is provided with a plurality of like apertures 27 in spaced longitudinal alinement in the separate legs 25 and in axially opposite alinement with the like apertures 27 of the opposite leg 25.

The present invention is further provided with a pair of beams 29 comprising upper and lower coextensive substantially parallel surfaces 31, 33, and a pair of oppositely spaced vertical side members 35, 37 in substantial perpendicular end attachment with the upper surfaces 31 and the lower surfaces 33 to form a beam having a substantially square cross sectional configuration. The length of the beams 29 is somewhat less than one half of the length of the trackways 22. The beams 29 are in substantial slidable engagement with the trackways 22 and are limited in their rearward travel within the respective trackways 22 by the stops 38 securely attached to the ends of the trackways 22. The beams 29 are maintained in axial spaced relation as by a plurality of trusses 39, 40, 41, 42, 43 interposed between and rigidly attached at their respective ends to the oppositely alined side members 37 of the beams 29 to form a carriage 44 slidably mounted beneath the trackways 22. The upper surfaces 31 of the beams 29 are provided with a plurality of spaced metal pads 46 interposed between the upper surfaces 31 of the beams 29 and the under-surfaces of the legs 23 of the trackways 22 to reduce the friction and wear caused by sliding the carriage 40 in a fore and aft direction as best illustrated in FIGS. 3 and 4 of the accompanying drawings.

It will be further seen upon reference to the drawings, that the depending vertical legs 25 of the trackways 22 provide additional means for maintaining the sliding carriage 40 in constant longitudinal sliding alinement with the trackways 22 and the superjacent longitudinal beams 13. The side members 35, 37 of the beams 29 are provided with a plurality of oppositely spaced longitudinally alined apertures 45, substantially equal in diameter to the apertures 27 carried by the vertically depending legs 25 of the trackways 22 and in selective register with the apertures 27 therein.

Each of the beams 29 is additionally provided with a laterally spaced sleeve 47 extending from the inner surface of the side member 35 in substantial parallel alinement with the top 31 and the bottom 33 of the beam 29 and in communication between the apertures 45 of the opposite side members 35, 37. The inner diameter of the sleeve 47 is substantially equal to the diameters of the communicating apertures 41 to provide an uninterrupted passage through the apertures 45 of the beam 29 and the internally disposed sleeves 47. The sleeves 47 are rigidly affixed to the inner surfaces of the adjacent side members 35, 37 as by welding or other suitable similar means. The present invention is further provided with a pair of axially oppositely spaced cylindrical latches 49 in slidable encircling engagement with the sleeves 47 mounted in the beams 29. The inwardly disposed ends of the sliding latches 49 are provided with undercut slotted shoulders 51 for linkable attachment to driving rods 53 as by the connecting pins 55. The driving rods 53 extend inwardly from the sliding latches 49 in substantial linear alinement and are pivotally attached to the elliptically configured eccentric plate 57. The inner terminals of the rods 53 are further provided with slightly flattened centrally bored ends 59 for journalled attachment about the pins 61 in pivotal engagement with the plate 57 at the substantial centers of the minor axes of the elliptical plate 57.

The elliptical plate 57 is further rigidly mounted upon a stub shaft 63 rotatably journalled within the shaft support bracket 65, which is securely attached to the forward side of the truss 39 carried by the sliding carriage 40. The stub shaft 63 is additionally provided with a rigidly attached angularly depending pivot arm 67 interposed between the elliptical plate 57 and the shaft support bracket 65 to impart a rotating movement upon the elliptical plate 57 and the attached stub shaft 63.

The depending pivot arm 67 is provided at its distal extremity with a pin 69 for journalled pivotal engagement with an actuating lever 71 extending from the distal end of the pivot arm 59 angularly upwardly and outwardly to a point substantially below one of the beams 29. The lever 63 is further maintained in its angular attitude as by a loop 73 attached to the lower surface of the truss 39 substantially beneath one end of the bracket 65 and by another slightly shorter loop 75 attached to the base 33 of the beam 29, and depending downwardly therefrom. The lever 71 is provided at its distal end with a handle 76 for actuating the lever 71 and the interconnected arm 67, the plate 57, the driving rods 53 and the sliding latches 49.

The sliding carriage 44 is securely mounted upon a conventional platform 77 substantially smaller than the carriage 44, provided with suspension spring hangers 79, springs 81 linkably suspended from the hangers 79, attached as by U-bolts 83 to an axle 85 journalled at its outer ends in the truck wheels. 87.

It will thus be seen, upon reference to FIG. 4 of the drawings, that the truck wheels 87 and the axle 85 support a superstructure upon which is mounted the sliding carriage 44 to comprise a wheel and axle assembly 89 to support the chassis 11, and a suitable superjacently attached container 21 for conveying merchandise and other material upon a roadway.

The sliding carriage 44 further comprises a longitudinally displaced pivot bearing plate 91 interposed between the rear surface of the forward end truss 39 and the somewhat rearwardly disposed succeeding intermediate truss 40. The pivot bearing plate 91 is rigidly attached at its forward end to the truss 39, and at its rearmost end to the truss 40. Angularly disposed braces 93 are provided to further maintain the rigid longitudinal alinement of the pivot bearing plate 91 between the respective trusses 39, 40 in the sliding carriage 44. A pivot 95 attached to platform 77 is journalled within the pivot bearing plate 91 to provide pivotal means for the wheel and axle assembly 89.

The sliding carriage 44 is further provided with a substantially rectangular plate 96 rigidly attached at its ends to the inner sides 37 of the oppositely spaced beams 29, and at its sides to the truss members 41, 42. The rectangular plate 96 is provided with a transversely disposed, substantially elongated, arcuately defined slot 97 for the reception therein of a caster pin 99 mounted on the upper surface of the platform 77 and extending upwardly therefrom through and beyond the arcuate slot 97. It will thus be seen upon reference to FIG. 3 of the accompanying drawings that the wheel and axle assembly 89 of the sliding carriage 44 is pivotable about the pivot pin 95 in the plate 91 and limited in its pivotal travel by the caster pin 99 moving arcuately through the inner periphery of the elongated slot 97.

Figure 7:
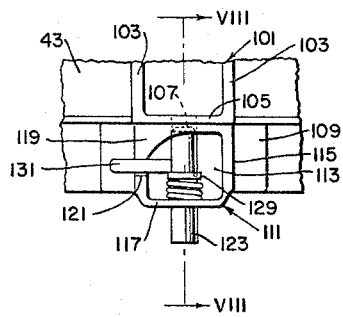
FIG. 7 is an enlarged fragmentary rear elevational view of the locking means of the present invention in open position.
Figure 8:
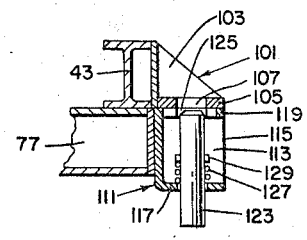
FIG. 8 is a fragmentary vertical cross sectional view of the locking means of FIG. 7 as taken on the line VIII—VIII of FIG. 7.

It will further be seen, upon reference to the accompanying drawings, and more particularly to FIGS. 6, 7 and 8 of the drawings, that the rearmost upstanding end of the support truss 43 is provided with a shoe 101 rigidly affixed to the substantial center of the truss 43 as by welding or similar means, the shoe 101 being substantially U-shaped comprising a pair of oppositely spaced substantially triangular ends 103 and a substantially rectangularly shaped base 105. The base 105 is further provided with a substantially centrally disposed aperture 107.

The present invention additionally comprises an attachment plate 109 secured to the rearmost vertical surface of the platform 77, a rearwardly extending housing 111 attached to the plate 109, and a window 113 defined in the rearmost wall of the housing 111. The window 113 comprises an upstanding substantially vertical side 115, a base portion 117 disposed substantially right angularly to the side 115, and a substantially inverse arcuate skirt section 119. The skirt 119 is provided with a recessed slot 121 somewhat below the center of the skirt 119. The window 113 is provided for access to a lock bolt 123 rotatably journalled within an aperture 125 in the base portion 117 of the housing 111 equal in diameter with the aperture 107 in the base 105. The lock bolt 123 is provided with an encircling helical spring 127 interposed between the base portion 117 and a collar 129 in rigid embraceable engagement with the lock bolt 123. The lock bolt 123 is further provided with a latch 131 for releasable engagement with the slot 121.

It will thus be readily seen upon reference to FIGS. 6, 7 and 8 of the drawings that when it is desired to lock the wheel and axle assembly 89 in parallel alinement with the chassis 11 to obtain a non-casterable condition, the latch 131 is rotated radially away from the containing slot 121 following the contour of the skirt 119 to allow the spring 127 to urge the collar 119 and the lock bolt 123 upwardly permitting the lock bolt 123 to move upwardly through the aperture 125 in the top of the housing 111 into the superjacently alined aperture 107 of the base 105 of the shoe 101, to lock the wheel and axle assembly 89 in such manner to maintain substantial parallel alinement with the chassis 11.

When it is desired to change the wheel and axle assembly 89 from the locked position hereinabove described to a swingable castering condition, the latch 131 is moved in a counter-clockwise direction in alinement with the arcuately depending contour of the skirt 119 until the latch 131 is depressed and engaged in the slot 121. When the latch 131 is engaged in the slot 121 the lock bolt 123 is depressed vertically to remove the uppermost end of the lock bolt 123 from embracing engagement with the aperture 105, allowing the wheel and axle assembly 89 to limitedly turn about the pivot 95 in the plate 91. The extent of the pivotal travel of the wheel and axle assembly 89 is limited by the arcuate length of the elongated slot 97.

It will thus be readily seen that in the use of the device of the present invention, when a pair of chassis 11 and attached containers 21 are linked in tandem for transporting materials, and it is desired to disengage the wheel and axle assembly 89 of the leading chassis 11 to facilitate the maneuverability of the two chassis in combination, the lock bolt 123 is rotatably lowered as by the latch 131 disengaging the lock bolt 123 from the aperture 107 of the shoe 101, permitting the wheel and axle assembly 89 to pivot or caster freely about the pivot pin 91; the extent of the castering movement being regulated by the length of the arcuate slot 97 and the pin 99 moving therein. It will thus be seen that when a tandem pair of chassis 11 are conventionally attached to a tractor 133 as best illustrated in FIG. 1 of the drawings, in transit, the casterable carriage 44 of the leading chassis 11 will allow the operator to turn within a smaller than conventional radius, and further distribute the load carried by the leading chassis to decrease the strain and stress on the connecting elements between the leading chassis and the trailing chassis. The aforesaid condition is best achieved when the carriage 44 of the leading chassis 11 is preferably in its rearmost position beneath the chassis 11.

When the leading chassis 11 is used, in transit, without a trailing chassis 11, the carriage 44 is locked out of castering condition by removing the latch 131 from the slot 121 allowing the spring 127 to urge the lock bolt 123 upwardly into embraceable engagement with the aperture 107. It will be observed from the drawings, and more particularly to FIG. 6 of the drawings, that the carriage 44 is locked out of castering condition only when the carriage 44 and the superjacently disposed longitudinal beams 13 are in substantial parallel alinement.

When one of the chassis 11 and an attached loaded container 21 are at rest, or detached from the tractor 133, the carriage 44 is positioned forwardly of the rearmost portion of the chassis by disengaging the sliding latches 49 from the apertures 27 in the legs 25 of the trackways 22. The disengagement of the latches 49 from the apertures 27 is achieved by moving the lever 71 away from the chassis 11 urging the pivot arm 67 into substantial vertical disposition, rotating the plate 57 in a clockwise direction sufficiently to cause the drive rods 53 to release the pivotally attached sliding bolts from the apertures 27. The chassis 11 may then be shifted rearwardly to move the carriage 44 forwardly to position the carriage 44 and the wheel and axle assembly 89 inwardly of the rear of the chassis to distribute the weight of the container 21 more evenly and more efficiently stabilize the load carried by the container 21. It will be further seen that when the chassis is disengaged from the tractor 133, the conventional landing gear 135 is lowered into ground contact to support the chassis 11 and the container 21 mounted thereupon.

We claim:

1. A chassis comprising a pair of structural members to support a container, spacing means interposed between said pair of structural members to maintain them in spaced relation, a pair of track means attached subjacent said pair of structural members and in alinement therewith, apertures defined in said track means, said apertures of one of said track means being oppositely alined with said apertures of the other of the track means, a pair of beams in slidable underlying engagement with said pair of track means, orifices carried by said pair of beams in selective slidable register with said oppositely alined apertures of said pair of tracks, sleeve means supported by said beams communicating between the respective orifices carried by said beams, brace means interconnecting said opposite beams to describe a carriage, latches within said sleeve means, means for shifting said latches in said sleeve means away from said sleeve means into engagement therebeyond with a selected opposite pair of said apertures of said track means to position said carriage within said track means, a bracket supported by a pair of said brace means of said carriage, caster means mounted upon a platform beneath said carriage, pivot means embraced by said bracket of said carriage in combination with said caster, means mounted upon said platform, locking means carried by said platform for engaging and disengaging said caster means, wheel and axle means attached to the said platform to support the aforesaid chassis and said container, a plate mounted between one pair of said brace means of said carriage, said caster means comprising an arcuate slot within said plate, and pin means carried by said platform extending from said platform into the area defined by said arcuate slot of said plate allowing the said platform to pivotally shift the axis of directional movement away from the axis of directional movement of said carriage and said chassis.

2. A chassis comprising a pair of structural members to support a container, spacing means interposed between said pair of structural members to maintain them in spaced relation, a pair of track means attached subjacent said pair of structural members and in alinement therewith, apertures defined in said track means, said apertures of one of said track means being oppositely alined with said apertures of the other of the track means, a pair of beams in slidable underlying engagement with said pair of track means, orifices carried by said pair of beams in selective slidable register with said oppositely alined apertures of said pair of tracks, sleeve means supported by said beams communicating between the respective orifices carried by said beams, brace means interconnecting said opposite beams to describe a carriage, latches within said sleeve means, means for shifting said latches in said sleeve means away from said sleeve means into engagement therebeyond with a selected opposite pair of said apertures of said track means to position said carriage within said track means, a bracket supported by a pair of said brace means of said carriage, caster means mounted upon a platform beneath said carriage, pivot means embraced by said bracket of the said carriage in combination with said caster means mounted upon said platform, means carried by said platform for engaging and disengaging said caster means, wheel and axle means attached to said platform to support the aforesaid chassis and said container, said locking means being provided with housing means attached to the leading edge of said platform, an aperture formed in the top of said housing, a bolt revolvably journalled in said housing, a collar circumferentially embracing said bolt, spring means helically embracing said bolt interposed between said collar and said housing urging said collar and said bolt upwardly into said aperture, and a shoe attached to said carriage in superjacency to said housing provided with an aperture for the containment of said bolt therein when said platform is positioned in axial juxtaposition with said carriage and in longitudinal alinement therewith.

3. A device in accordance with claim 2, wherein said revolvable bolt is provided with latch means, said latch means attached to said bolt adjacent said collar extending away from said bolt and said housing through a window formed in said housing, and an arcuate path inscribed in said window bearing against said latch means to urge said latch means spirally downwardly along said arcuate path to urge said bolt downwardly away from embracing contact with said aperture of said shoe of said carriage positioned above said platform.

4. A device in accordance with claim 3, wherein said arcuate path in said window is provided with recess means, said recess means formed in the lowermost portion of said arcuate path to retain therein said latch means when said latch is retracted from said aperture of said shoe with said spring further urging said latch means against inner periphery of said recess to maintain said bolt in unlocked position to allow said platform to pivot freely relative to said carriage.

References Cited
UNITED STATES PATENTS

| | | | |
|---|---|---|---|
| 2,841,411 | 7/1958 | Sheppard et al. | 280—81 |
| 2,919,928 | 1/1960 | Hoffer | 280—81 |
| 2,962,295 | 11/1960 | Tenenbaum | 280—81 |
| 2,976,051 | 3/1961 | Morey | 280—81 |
| 2,982,563 | 5/1961 | Gregg | 280—81 |
| 3,102,738 | 9/1963 | De Roshia | 280—415 |
| 3,112,935 | 12/1963 | Gregg et al. | 280—81 |

LEO FRIAGLIA, *Primary Examiner.*